United States Patent

Hartog et al.

[11] Patent Number: 5,946,715
[45] Date of Patent: Aug. 31, 1999

[54] PAGE ADDRESS SPACE WITH VARYING PAGE SIZE AND BOUNDARIES

[75] Inventors: Adrian Hartog, Toronto; Sanford S. Lum; Fridtjof Martin Georg Weigel, both of Scarborough, all of Canada

[73] Assignee: ATI Technologies Inc., Ontario, Canada

[21] Appl. No.: 08/311,172

[22] Filed: Sep. 23, 1994

[51] Int. Cl.[6] .................................................... G06F 12/00
[52] U.S. Cl. ...................... 711/207; 711/170; 711/171; 711/172; 711/173; 711/206; 711/208; 711/209
[58] Field of Search .............................. 395/417, 19, 427, 395/418, 419, 490; 364/200; 711/201, 203, 206, 170–173, 207–209

[56] References Cited

U.S. PATENT DOCUMENTS

| | | | |
|---|---|---|---|
| 4,096,573 | 6/1978 | Heller et al. ............................ | 395/417 |
| 4,972,338 | 11/1990 | Crawford et al. ...................... | 711/206 |
| 5,058,003 | 10/1991 | White ..................................... | 395/419 |
| 5,095,526 | 3/1992 | Baum ..................................... | 395/740 |
| 5,440,710 | 8/1995 | Richter et al. ......................... | 711/207 |

*Primary Examiner*—Eddie P. Chan
*Assistant Examiner*—Than V. Nguyen
*Attorney, Agent, or Firm*—Pascal & Associates

[57] ABSTRACT

A method of addressing a computer subsystem memory comprised of establishing an aperture having a predetermined page size, addressing the memory at address boundaries defining multiples of half the page size, and reading or writing a page of data from or to the subsystem memory using the established aperture at consecutive memory locations beginning at one of the boundaries.

7 Claims, 2 Drawing Sheets

# PAGE ADDRESS SPACE WITH VARYING PAGE SIZE AND BOUNDARIES

FIELD OF THE INVENTION

This invention relates to the field of display controllers in computers, and in particular to a method of addressing screen memory in a computer display controller, which is usefully incorporated in a graphics accelerator circuit.

BACKGROUND TO THE INVENTION

Display controllers of computers must access screen memory, reading and writing data that is to be displayed. Typically, to save address space, the memory is accessed in a page mode, whereby a page of data is read or written in a block, from or to consecutive memory addresses defined by a base address. These memory addresses are defined by an aperture.

An aperture is an address space which maps to a memory, so that a host central processing unit (CPU) may read or write that memory directly. A memory supporting a VGA display has several possible aperture configurations, e.g. 32K bytes beginning at a memory segment address 0xB000, 32K at 0xB800, 64K at 0xA000 or 128K at 0xA000. The configuration depends on the graphics mode used.

Many graphics modes that are used in modern computers are retained for historical reasons, i.e. for compatibility with older computers, and emulate older display adapters such as CGA or MDA display adapters. For this reason modern computers have many aperture configurations.

There are currently five standard host expansion buses for microprocessors having type x86 CPUs: ISA (Industry Standard Architecture), EISA (Extended ISA), MCA (MicroChannel Architecture), VLB (VESA Local Bus), and PCI (Peripheral Component Interconnect). The largest number of personal computers in current use contain ISA buses, which support addressing of up to only 16 Mb. As will be described below, a computer using this type of bus also is limited in the size of aperture it can use.

As shown in FIG. 1, which illustrates a prior art memory architecture, VGA operated in so-called planar mode. This memory used four planes 1 of 64 Kbytes, which were each accessed using the same address space. Any of the planes could be masked out. This allowed the entire 256K VGA screen memory to be accessed through a 64K address space.

In more recent years, display adapters have been designed with increasing amounts of memory, to handle higher resolution and deeper pixel depths, for example 512K, 1M, 2M, or even likely up to 8M. To solve the problem of addressability, programmers began to page the aperture, ceasing use of planar modes because they were difficult to use, and they no longer needed them for full memory addressability. Read pages and write pages were specified independently, avoiding the use of intermediate buffers.

To access screen memory in more recent display adapters, with reference to FIG. 2, assume that a blit (transfer of image data from one part of the screen memory 3 to another) operation is to be performed, a common operation. The host CPU sets read and write pages 5 and 7 independently, setting independent apertures for read and write. It reads the memory page 5 using the read aperture and then directly writes the memory page 7 using the write aperture, in a memory move operation. Without independent read and write pages, the host CPU must set the source page, read using the aperture into a host buffer, set the destination page, and write to the aperture from the host buffer. These read and write pages may be mapped to the same address space.

In the independently set read and write procedure noted above, a problem occurs when one or both of the pages crosses a page boundary 9, as shown in FIG. 3. Pages tended to be either 64K or 128K in size and could only be set with boundaries which were a multiple of 64K or 128K respectively. For example, the read page 5 in FIG. 3 is so large that it crosses the boundary 9 in the memory 3 which boundary is set by the aperture. The aperture is dependent on the type of host bus.

In a worst case scenario, both read and write pages cross a page boundary, causing three page changes (or more page changes if either source or destination are greater in size than a maximum page size. In the best case scenario, both source and destination pages are less than the page size in length, and do not cross any page boundaries, and result in only one page change in a read and write (move) operation described above. It will be understood that each page change results in a performance penalty.

Linear apertures were introduced with the introduction of the 80386 CPU. In this type of aperture, sizes greater than or equal to the memory size can be specified, and the aperture can be configured to any base memory address location. On CPUs of the x86 family earlier than the 80386, screen memory only up to 16M could be addressed, and large linear apertures would constrain the maximum system memory size. However at this time the 80386 and later CPUs of this family can address up to 4G of memory, and therefore a multi-megabyte aperture can be used with virtually no penalty. A variable page boundary 11 is shown in FIG. 4, to illustrate this concept.

Yet both applications and display adapters should be able to be used on the older ISA bus architecture, as well as the newer 80386 and higher CPU architectures. To revert to the paged aperture scheme for the 80386 CPU in order to provide backward compatibility inflicts a heavy performance penalty for paging.

Thus until now, either the performance penalty must be accepted, or backward compatibility of the display adapter unavailable.

SUMMARY OF THE INVENTION

The present invention provides a method of accessing a subsystem memory such as screen memory which provides backward compatibility with the ISA architecture, which deals with apertures that would cross page boundaries, and which facilitates use of large memories, such as those that can be addressed by the 80386 and later CPUs of the same family.

In accordance with the present invention, a method of addressing a computer subsystem memory is comprised of establishing an aperture having a predetermined page size, addressing the memory at address boundaries defining multiples of a fraction of the page size, and reading or writing a page of data from or to the subsystem memory using the established aperture at consecutive memory locations beginning at one of said boundaries.

In accordance with another embodiment, a method of addressing memory in a computer subsystem is comprised of establishing a page size, establishing a number of apertures each of a fraction the page in size and totalling a page in size, and having contiguous aperture addresses defining the fraction of a page memory location boundaries up to the page size, and reading or writing a page of data from or to the memory, at consecutive memory locations beginning at one of the memory locations.

BRIEF INTRODUCTION TO THE DRAWINGS

A better understanding of the invention will be obtained by reading the description of the invention below, with reference to the following drawings, in which:

FIGS. 1–4 illustrate subsystem memories accessed in accordance with methods used in the prior art, FIG. 5 illustrates a subsystem memory accessed in accordance with one embodiment of the invention, and FIG. 6 illustrates a subsystem memory accessed in accordance with another embodiment of the invention.

DETAILED DESCRIPTION OF THE INVENTION

Figure 1:
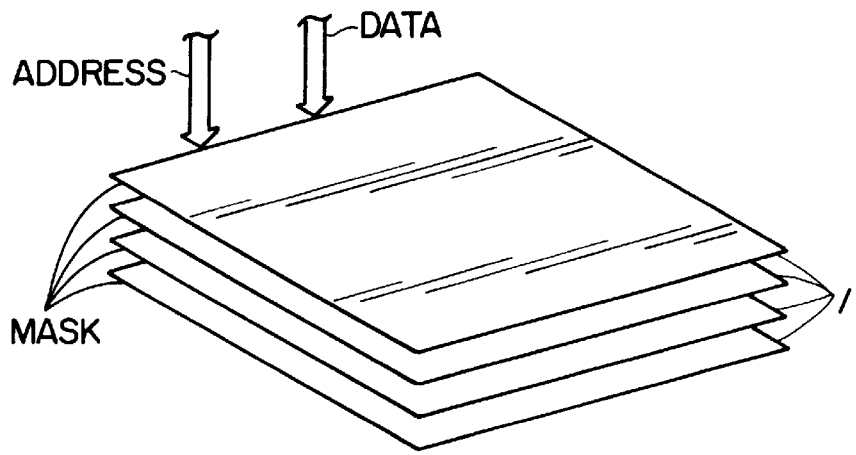
Figure 2:
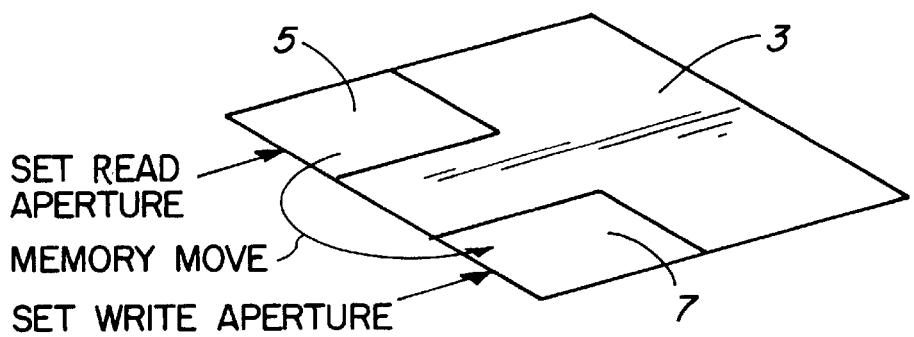
Figure 3:
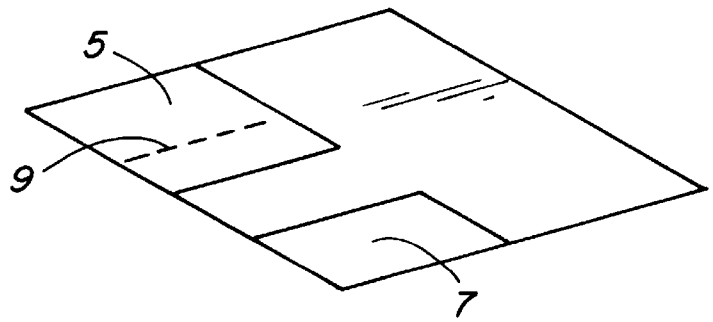
Figure 4:
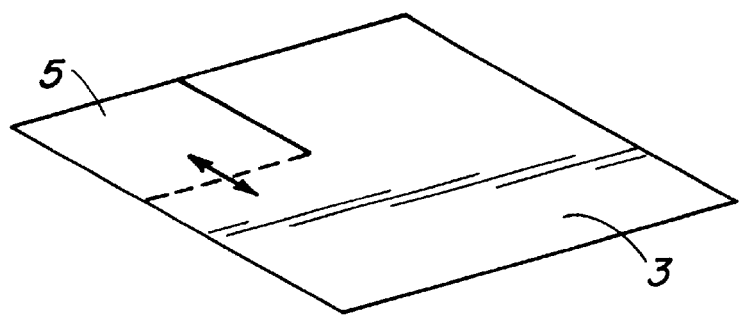
Figure 5:
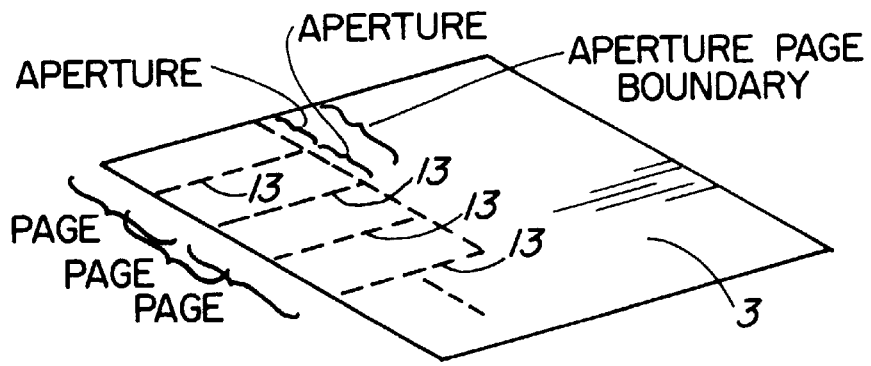

With reference to FIG. 5, a memory 3 is paged with an aperture at address multiples of half the page size and having page boundaries 13. For example, if the page size is 64K, the page is addressed for both read and write operations from 32K boundaries. The aperture thus addresses page windows between 0–64K, between 32–96K, between 64–128K, in general between (n)32K and (n+1)32K, where n=0 or an integer, into graphics memory. In this manner, page faults are much less likely to occur because a source or destination page size of less than 32K will never generate a page fault.

However, 64K pages can be written or read using an aperture definition of a single base address, which conforms to the paged aperture requirement of older CPU architectures. In addition, the aperture can be anywhere in the memory, which allows use of a large memory that can be addressed by 80386 and later CPUs of the same family.

While 64K pages are given in the example above with addressing at half page multiples, the invention is similarly applicable to aperture addressing at multiples which are a different fraction of the page.

The method involves, for a read or write operation, establishing an aperture having a predetermined page size, addressing the computer subsystem memory at address boundaries defining multiples of half or a different fraction of the page size, and reading or writing a page of data from or to the memory using the established aperture at memory locations beginning at one of the boundaries.

More particularly, for read and write operations, the method includes the steps of establishing a read aperture and establishing a different write aperture, reading the memory using the read aperture at first consecutive memory locations beginning at an address which is at a boundary defined by a multiple of the fraction (e.g. half) of the page size, and writing the memory at second consecutive memory locations beginning at a different address location which is at a boundary defined by the multiple of the fraction (e.g. half) the page size.

The same data can be read and written using the respective apertures. In this case, the aperture size (i.e. address breadth) will be the same for both read and written data, while the base addresses will be different.

However, the data can be read, processed by the host or a subsystem CPU or other circuitry, and then written to the memory. In this case the aperture size will be different for the read and written data, since the processing may have removed some data or may have added some data.

In both this and the following embodiment, the functions of establishing the aperture or apertures is performed by the host or display subsystem CPU or logic circuitry, as is the addressing, reading and writing, in a well known manner.

Figure 6:
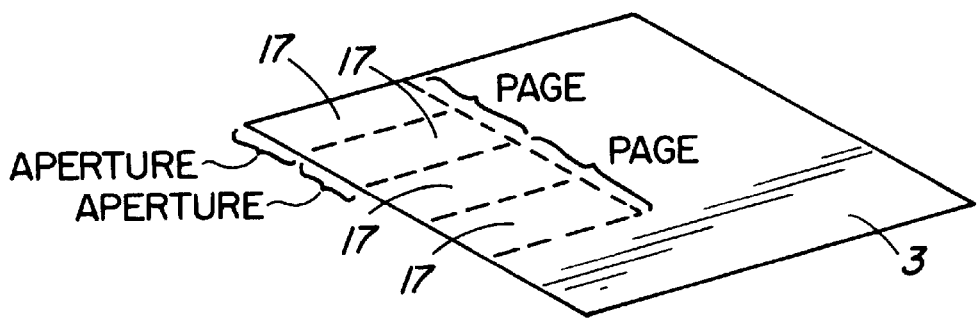

FIG. 6 illustrates a memory addressed in accordance with another embodiment of the invention. In this embodiment an aperture addresses the memory locations of a fraction, e.g. half, the page size, but at contiguous addresses. In the figure two apertures are shown addressing two half pages 17 at contiguous aperture memory addresses. For 64K byte pages, the apertures define boundaries of 32K bytes. Each of the contiguous aperture addresses (i.e. the base addresses of consecutive memory locations for each half page) are independent for the read and write operations. For example, read page pointers for the 32K boundaries can be set at 0xA000 and 0xA800 (hex).

In operation, in accordance with an embodiment of the invention, a page size is established, and a pair of apertures are established, each of half the page size, and having contiguous aperture addresses defining half page memory location boundaries. A page of data is then read or written from or to the memory, at consecutive memory locations beginning at one of the boundaries.

In more detail, a pair of read apertures are established, and a different pair of write apertures. The memory is read using at least one read aperture at first consecutive memory locations beginning at an address which is at a boundary defined by the at least one contiguous aperture address. The memory is written at second consecutive memory locations beginning at a different address location which is at a boundary defined by one of the different pair of write operations.

The same data read using at least one read aperture may be written using the different address location. However, the read data may be processed prior to writing. In the latter case the apertures may be different in size.

In this example, if the page size is 64K, the boundaries of each half page will be at 0, 32K, 64K . . . (n)32K, where n is 0 or an integer.

In this case as well as the first embodiment, the boundaries of the apertures need not be at the half page address locations, but may be at multiples of any fraction of the page size.

Thus with the present invention, paged apertures can be provided for display subsystems which use the older ISA architecture, yet because a large memory can be accessed, with independently set apertures, the display subsystem can be used with large memories, using linear arbitrarily large apertures.

A person understanding this invention may now conceive of alternative structures and embodiments or variations of the above. All of those which fall within the scope of the claims appended hereto are considered to be part of the present invention.

We claim:

1. A method of addressing a computer subsystem memory comprising:

(a) establishing an aperture having a predetermined page size, (b) addressing the memory at address boundaries defining multiples of half the page size, and (c) reading or writing a page of data from or to the subsystem memory using said established aperture at consecutive memory locations beginning at one of said boundaries, including the steps of establishing a read aperture and establishing a different write aperture, reading said memory using the read aperture at first consecutive memory locations beginning at an address which is at a boundary defined by a multiple of half the page size, and writing the memory at second consecutive memory locations beginning at a different address location which is at a boundary defined by a multiple of half the page size.

2. A method as defined in claim 1 in which the address boundaries are 0–64 K bytes, 32 K–96 K bytes, 64 K–128

K bytes . . . n(32) K bytes–(n+1) (32) K bytes, where n is 0 or an integer, and an upper boundary is smaller than the size of the memory.

3. A method of addressing memory in a computer subsystem comprising:
   (a) establishing a page size,
   (b) establishing a pair of apertures each of half the page in size, and having contiguous aperture addresses defining half page memory location boundries,
   (c) reading or writing a page of data from or to the memory, at consecutive memory locations beginning at one of said boundaries,
   including the steps of establishing a pair of read apertures and a different pair of write apertures, reading said memory using at least one read aperture at first consecutive memory locations beginning at an address which is at a boundary defined by said at least one contiguous aperture address, and writing the memory at second consecutive memory locations beginning at a different address location which is at a boundary defined by one of said different pair of write apertures.

4. A method as defined in claim 3 in which the same data read using at least one read aperture is written beginning at said different address location and using said write aperture.

5. A method as defined in claim 3 in which data read using at least one read aperture is processed and then written beginning at said second memory location and using said write aperture.

6. A method as defined in claim 3 in which the read and write apertures are different in size.

7. A method as defined in claim 3 in which the boundaries of each half page are 0 bytes, 32 K bytes, 64 K bytes . . . (n)(32) K bytes, where n is an integer.

* * * * *